Dec. 4, 1962  J. K. BURNHAM  3,066,551
DIFFERENTIAL
Filed Aug. 24, 1960  3 Sheets-Sheet 1

INVENTOR
James K. Burnham
BY
Mason, Fenwick & Lawrence
ATTORNEYS

Dec. 4, 1962

J. K. BURNHAM 3,066,551

DIFFERENTIAL

Filed Aug. 24, 1960

INVENTOR

James K. Burnham

BY Mason, Fenwick & Lawrence

ATTORNEYS

Dec. 4, 1962   J. K. BURNHAM   3,066,551
DIFFERENTIAL
Filed Aug. 24, 1960   3 Sheets-Sheet 3

INVENTOR
James K. Burnham
BY Mason, Fenwick & Lawrence
ATTORNEYS

United States Patent Office 3,066,551
Patented Dec. 4, 1962

3,066,551
DIFFERENTIAL
James K. Burnham, Mexico City, Mexico
(351 Laveta Terrace, Los Angeles 26, Calif.)
Filed Aug. 24, 1960, Ser. No. 51,562
3 Claims. (Cl. 74—650)

This invention relates to power transmission devices, and particularly to improvements in devices for transmitting torque differentially to a pair of axially aligned shafts and commonly referred to as differentials, or differential mechanisms. The device has particular use in automobiles and other powered land vehicles, but is capable of use in any machine where a differential drive is essential.

The so-called differential gears conventionally used in automobiles employ planetary gear systems, and the driving wheel which rotates the faster receives more of the torque load, with the result that a wheel which loses traction and imposes no load on the power train receives the full torque load to the exclusion of the wheel which has traction and would be able to convert the torque to useful work. Efforts to overcome this, and to apply power to the wheel having traction, have been made, but the suggested devices either make provision for clutching the the two driven axles together—which on a curve compels skidding—or to mechanically disconnect one axle to permit override on the curves, with the attendant difficulty of reengagement immediately when desired and alternating between the axles until proper engagement is made. These suggested devices are not only costly and cumbersome, but greater maintenance problems are involved.

The general object of the present invention is to provide an improved differential which will fully eliminate the wheel-spinning problem and apply full torque to the wheel having traction.

A more specific object of the invention is to provide a device of this nature which permits the faster-running shaft, or wheel, to overrun the slower, with immediate reengagement when relative rotation ceases, without locking the wheels or shafts together.

Another object is the provision of this type of differential wherein when both shafts, or wheels, are overrunning the driving torque, the slower-running shaft, or wheel, will overrun with the result that the full effect of the braking action of the driving means may be applied to the wheels.

A further object is to provide a differential wherein a pair of overrunning mechanisms, each reversibly engageable and having intermediate disengaged positions, are so linked that when one is engaged the other may be disengaged but cannot move to its reverse position of engagement.

Still another object is the provision of a differential having pairs of overrunning mechanisms in which the overrunning mechanisms are linked so that if the interlocking members of one overrunning mechanism move to disengaged position while the other remains engaged, the disengaged members will be resiliently urged toward reengagement, to effect instantaneous reengagement when the cause for overrunning is no longer present.

A still further object of the invention is to provide a differential employing overrunning clutches, or mechanisms, with movable interlocking members, with means for automatically compensating for wear to ensure positive and immediate interlocking movement of the members upon proper locking motion being applied.

Other objects of the invention will become apparent from the following description of one practical embodiment thereof, when taken in conjunction with the drawings which accompany, and form part of, this specification.

Figure 1:
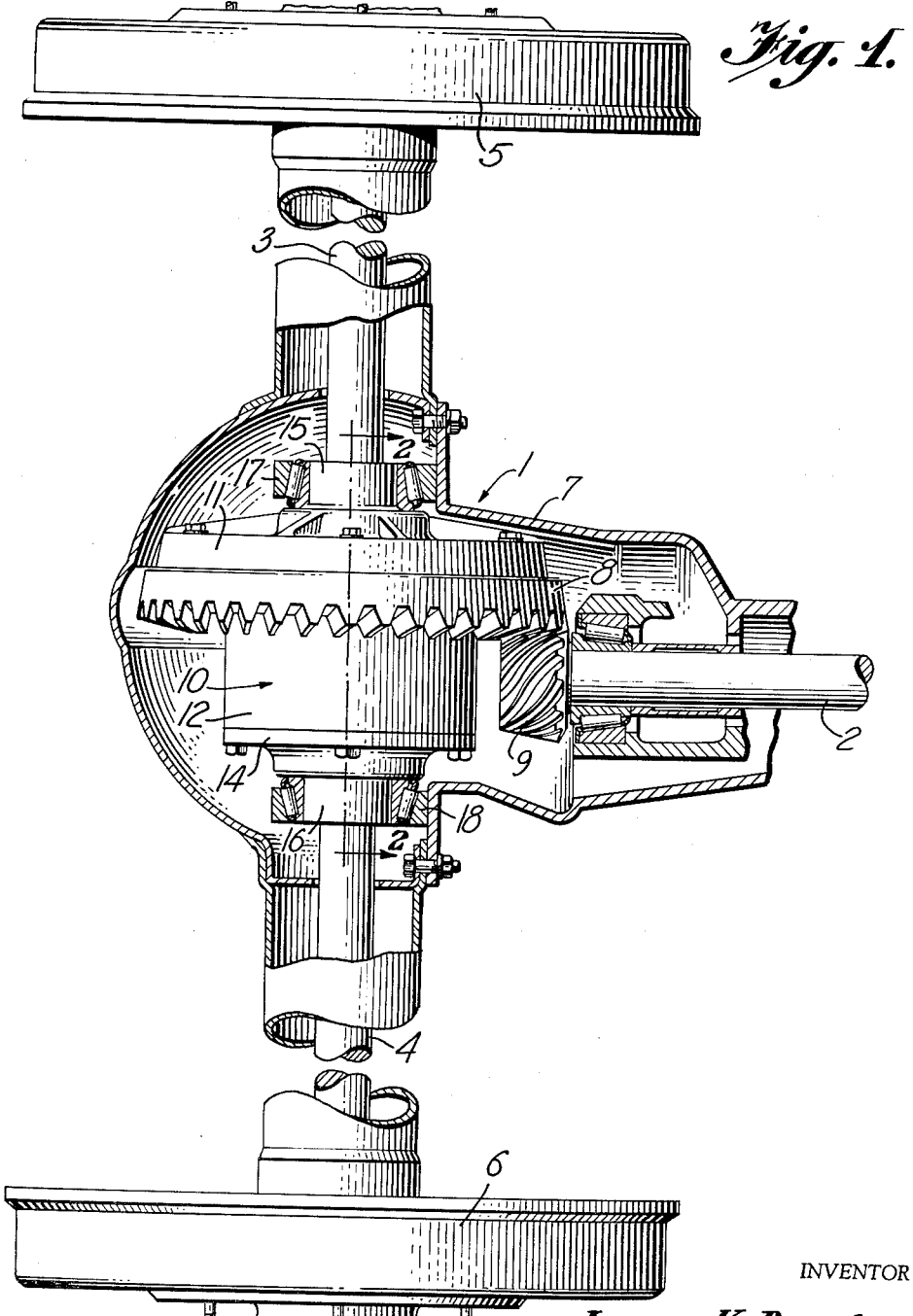
FIGURE 1 is a top plan view of a differential embodying the principles of this invention, the differential being interposed between a vehicle drive shaft and the drive axles, parts of the casing being broken away.
Figure 2:
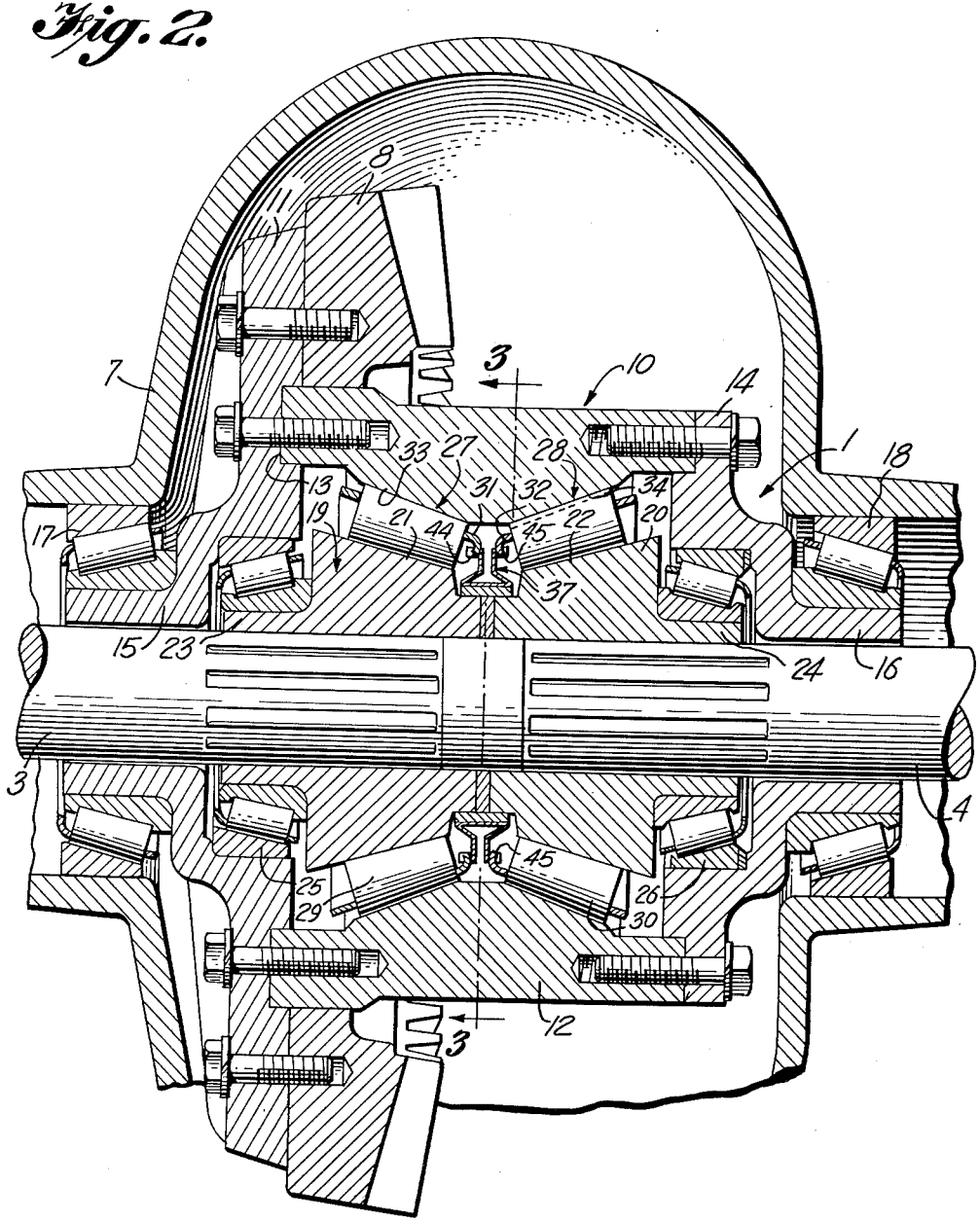
FIGURE 2 is a vertical section through the differential, taken on the line 2—2 of FIGURE 1.
Figure 3:
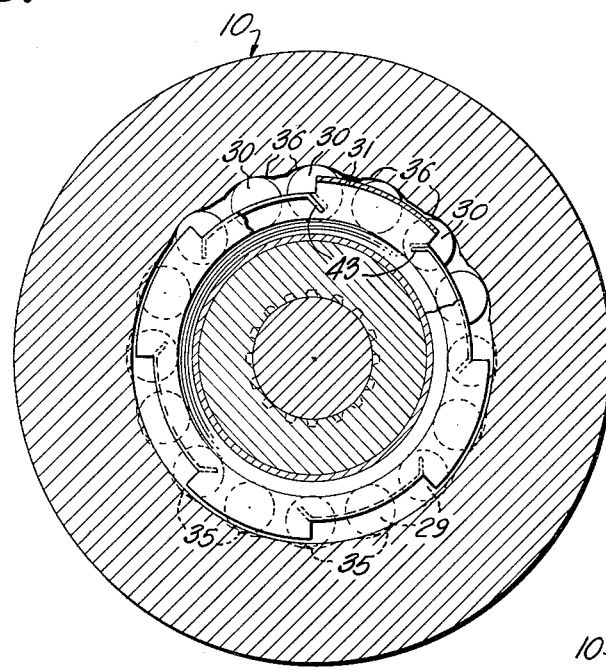
FIGURE 3 is a transverse section through the differential, taken substantially on the line 3—3 of FIGURE 2.
Figure 4:
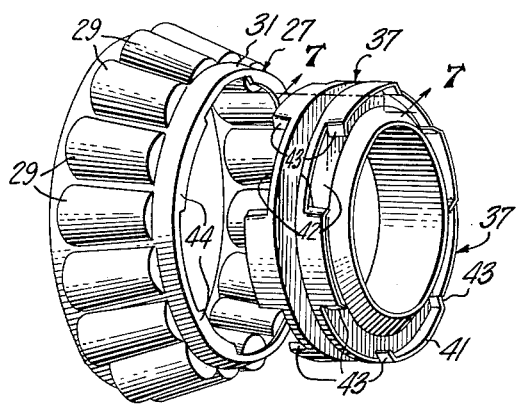
FIGURE 4 is a perspective view of one of the overrunning clutches, or devices, shown with the indexing member that serves as a control link between a pair of overrunning members.
Figure 5:
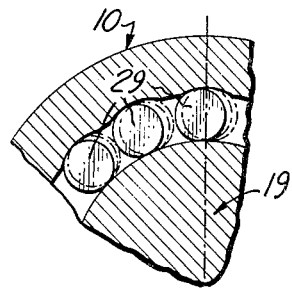
FIGURE 5 is a partial transverse section through the differential in the area of the overrunning devices, to illustrate the wedge locking and release movements of the interlocking bodies, or members.
Figure 6:
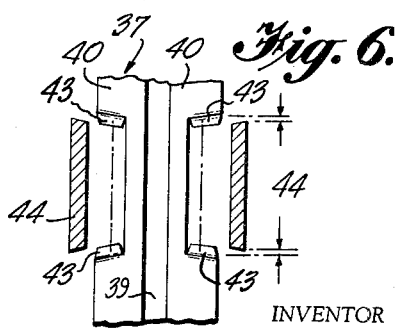
Figure 7:
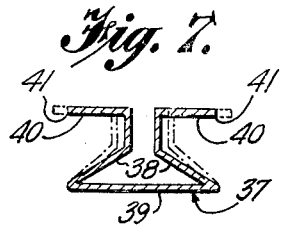

FIGURE 6 is a somewhat diagrammatic view with a portion of the indexing collar being shown in plan, and the interfitting teeth of adjacent overrunning mechanisms being shown in section, the several parts being shown separated for clarity; and FIGURE 7 is a section through the indexing collar, taken on the line 7—7 of FIGURE 4, illustrating the stressed, operative, cross-sectional shape of the collar in full lines, and the unstressed, pre-assembly, cross-sectional shape of the collar in dotted lines.

In general, the invention contemplates a differential wherein torque, delivered by a drive member, is transmitted by means of a pair of overrunning mechanisms to a pair of axially aligned shafts, or axles. The overrunning mechanisms will have spaced engaged positions for reverse operation, with intermediate positions of disengagement, and an interconnecting control link will be used to permit one overrunning mechanism to move to disengaged position while the other remains engaged, yet holds the disengaged mechanism against movement into its reverse engaged position.

It is to be understood that the differential is capable of use in any machine where a drive torque is to be transmitted to a pair of shafts which must be capable of differential operation under certain circumstances, and is particularly adapted to use in transmitting power from an automobile drive shaft to the wheels. For purposes of illustration, and to simplify the disclosure, the device will be described in connection with an automobile drive.

Referring to the drawings in detail, there is shown a differential 1, incorporating the present invention, operatively interposed between a drive shaft 2 and rear axles 3 and 4. The axles carry wheel hubs 5 and 6, and the axles, drive shaft and differential are enclosed in a suitable housing 7. The differential includes a bevelled ring gear 8, which is in mesh with a pinion 9 on the drive shaft 2.

The differential, as shown, includes a shell 10, having a circular base plate 11, a cylindrical body 12, seated in an annular groove 13 in the base plate and having its opposite end closed by a cap plate 14. The several parts of the shell are bolted, or screwed, together. Base plate 11 has a hub portion 15, and cap plate 14 has a hub 16. The two hubs are in axial alignment and concentric to the cylindrical body of the shell. The hubs are fixed in anti-friction bearings 17 and 18, mounted in the housing 7. The ring gear 8 encircles the body of the shell and is bolted to the base plate 11. Thus, whenever gear 8 is rotated, shell 10 will rotate in its bearings 17 and 18.

The ends of axles 3 and 4 are fitted with ferrules 19 and 20 which are centrally bored and splined to key on the splined ends of the axles. The ferrules have frustoconical portions 21 and 22, from the bases of which extend hubs 23 and 24. The hub 23 of ferrule 19 fits into an anti-friction bearing 25, seated in the base plate 11 of shell 10. Hub 24 of ferrule 20 is mounted in bearing 26, carried by the cap plate 14 of the shell. By this arrangement, the inner ends of axles 3 and 4 are mounted for rotation within the shell, concentric to the shell and in axial alignment with one another. This mounting will allow the axles and shell to rotate together as a unit, or either axle to rotate independently.

The coupling of the axles to the shell is accomplished by means of clutching members 27 and 28 interposed between the frusto-conical portions of the axle ferrules and the inner wall of the shell. The clutching members may consist of a plurality of rollers 29 and 30, held in spaced, circular formation by means of cage elements 31 and 32, similar to the retainer elements used for holding roller bearings. The rollers may be cylindrical, or tapered, and are shown tapered with the apices of the projected cones of their axes being common with that of the frusto-conical portions of the axle ferrules. The rollers are free to roll upon the surfaces of the frusto-conical ferrules as their respective cages are rotated relative to the axles.

The inner wall of the shell 10 is shaped to conform to the conical pattern of the clutch members 27 and 28. Thus, the shell wall is provided with oppositely tapered, conical, inner wall sections 33 and 34. The wall sections 33 and 34 are vaulted, as at 35 and 36, to provide arcuate recesses in which the several rollers of the clutching members may operate. Recesses 35 and 36 will be circumferentially spaced around the conical surfaces of the shell wall equidistantly in accordance with the number of rollers in the clutching members. The recesses are sufficiently deep at their centers to accommodate the rollers without contact of the rollers with the recess walls when the rollers are positioned centrally of the recesses so that the rollers will be freely rotatable without clutching action when in that position, but decline toward their ends so that the rollers will bind in wedging relation between the recess walls and the axle ferrules when the rollers are at either of the ends of the recesses. Therefore, the rollers will act as clutch members to couple the axle ferrules, and consequently the axles, to the shell whenever the clutching members are rotated relative to the shell so that the rollers are moved to one end of the recesses to become wedged therein. This is similar to the action of a conventional overrunning clutch. The arcuate formation of the recesses permits engagement of the rollers when moved toward either of the recess ends and, therefore, clutching action will take place irrespective of the direction of rotation of the unit.

From the above, the clutching action will be clear, and it is evident that with the structure described the two axles will be driven equally whenever the shell is rotated by the drive shaft. This is by reason of the fact that both clutches will be engaged. If, however, one wheel and its axle begin to overrun the shell speed, as on a curve, the faster axle speed will cause the clutching elements, or rollers, to move out of wedging relation with the axle ferrule and shell recess and run free. This will provide the differential wheel operation. It is important, however, that the rollers do not move to the other sides of their recesses and wedge therein and so re-engage the clutch.

In order to hold an overrunning clutch from reverse engagement while the other clutch is engaged, a control collar 37 is employed to link the two clutches while permitting sufficient relative movement to allow one clutch to become disengaged while the other remains engaged. Means are also provided to urge the disengaged clutch toward reengagement, so that immediate reengagement will take place when the overrunning ceases.

The control linking device may take several forms, but it is shown as being an annular collar which in cross-section is in the form of a double Z, with the two Z-forms arranged back-to-back in reverse order and their bases integral. The collar is of spring material so that the connecting webs 38 of the Z-forms may be flexed to change their angular relation to the base 39 and to adjust the spacing between the top flanges 40. The flanges 40 are substantially parallel to the base and have outer free edges 41. Flanges 40 are notched inwardly from their free edges at one or more places, with the sides of the notches 42 converging inwardly. Tabs 43 are left at the notch sides when the material is stamped, and the tabs are bent inwardly of the collar at approximately 45° to the flange surface, to form spring fingers, as will be described. The cages 31 and 32 of the clutching members have downturned edges on their confronting sides, and these are provided with one or more radially directed teeth 44 and 45, equal in number to the notches of the flanges 40 of the collar and adapted to fit into the collar notches to couple the clutch members to the collar. The teeth of the cages will have their edges inclined in conformity with the taper of the notches and spring fingers 43 so that maximum contact between the teeth and spring fingers will be had.

When the collar and clutch members are assembled, with the teeth of the cages in the notches of the collar, the teeth will seat against the back walls of the notches and their edges will be in contact with the spring fingers 43 at either side of the notches. Thus, the collar and clutch members will rotate in unison unless some force is applied to cause one of the clutch members to exert sufficient pressure against the spring fingers at one side of the notches with which it is engaged to flex the fingers and allow the clutch to move relative to the collar. The pressure of the flexed fingers against the teeth of the clutch member will cause the teeth to move back to central positions in the notches as soon as the moving force is removed.

The spacing between the ferrules on the axles, and the dimensions of the clutch members and control collar are such that when the differential is assembled the teeth of the clutch cages bearing against the back walls of the collar notches will flex the connecting webs 38 of the collar Z-form members to cause the top flanges 40 of the collar to approach one another to the position shown in full lines in FIGURE 7. This puts the collar under stress, with the spring material tending to return to its unstressed position, as shown in dotted lines in FIGURE 7. The collar, therefore, acts as a biasing means to urge each of the clutching cones into tight contact with the axle ferrule upon which it rides so that the movement of the rollers on the ferrules and within the vaulted recesses of the shell will be precise and uniform.

When the differential is assembled and mounted in a vehicle, or machine as the case may be, rotation of the drive shaft 2 will cause rotation of the shell 10. As the shell moves, the rollers of the clutches will be wedged tightly in the wings of the vaulted recesses and thereby held against rotation. This will lock the rollers upon the ferrules and the shell and axles will rotate as a unit. This will be the action of the device when the vehicle is traveling in a straight line and the two wheels have equal traction.

When the vehicle is on a curve, or on an unequal road surface, one wheel will overrun the other. When this occurs, the faster moving axle will move relative to the shell, in the direction of shell rotation, causing the rollers of the clutch on that axle to ride out of wedged position in the wings of the shell recesses, toward the center of the recesses. This can occur when the overrunning force becomes sufficient to overcome the spring action of the fingers 43 and flex them. The fingers, however, will maintain their pressure upon the clutch teeth so that the rollers will not move to the recess centers but will move just far enough to be disengaged. Very light contact with the recess walls will be maintained. Thus, as soon as the overrunning ceases, the spring fingers will immediately return the rollers to wedged position.

It is important that the total movement permitted the teeth of the clutch cages in the notches of the collar is not sufficient under any condition to allow one clutch to move to reverse engagement with its shell recesses while the other clutch remains engaged. It will be understood that during the time one axle is overrunning full torque will be delivered to the other. As soon as the overrunning ceases, reengagement will occur and torque will be equally applied to the two axles.

When the vehicle is moving in reverse, the action of the differential will be exactly as described above, except that the direction of rotation will be reversed and the rollers will engage in the opposite ends, or wings, of the recesses.

When the vehicle is upon a down grade, or for other reasons the momentum of the vehicle overcomes the engine torque, the rollers of both clutch elements will roll out of engagement with the trailing ends of the recesses and roll into wedging engagement with the leading ends of recesses. Under the conditions torque is transmitted from the axles through the clutch elements to the shell, and from the shell to the engine so that the engine may act as a brake to retard vehicle motion. If the vehicle goes into a curve one wheel will begin to rotate faster than the other. Since the clutch elements are already in engagement at the leading ends of the recesses, they cannot move further forward. The slower moving axle, however, will lag behind and its clutch element will move back releasing it for free movement. The faster moving wheel, therefore, will receive the full effect of engine braking so that complete control is maintained. Here again, the clutching element moving out of engagement will be held by the spring fingers in very light contact with the recesses so that immediate reengagement will be had when the axle speeds are again equal.

In the special case where one wheel loses traction, there will be no drag by that wheel and full torque will be taken by the wheel having traction. As the wheel having traction will be engaged, the shell and consequently the vehicle drive shaft, can rotate no faster than that wheel will permit. Therefore, there will be no overriding, or spinning, of the wheel without traction, but that wheel will follow the ground as the vehicle moves.

While in the above one practical embodiment of the invention has been disclosed, it will be understood that the details of construction shown and described are merely by way of illustration and the invention may take other forms within the scope of the appended claims.

What is claimed is:

1. A differential drive mechanism comprising a hollow rotatable shell, a ring gear carried by the shell by which the shell may be rotated, a pair of axles having their ends journalled in the shell for rotation relative thereto, the shell and axles having common axes of rotation, the adjacent ends of the axles having conical surfaces converging toward the axle adjacent ends, the shell having pluralities of arcuately spaced recesses on its inner wall, one plurality encircling each axle end, a clutch including a cage having a plurality of rollers therein equal in number to the recesses in each plurality encircling each axle end with the rollers in surface contact with the conical surfaces of the axle ends and lying partially within the recesses, each recess having a vaulted center area and tapering ends parallel to the roller surface with which they coact whereby the roller therein may wedge in the tapering ends to lock the axle and shell together in engaged positions and lie in the vaulted center area free for rotation upon the axle in disengaged position, and a control collar interconnecting the cages to hold the clutches against rotative movement relative to one another beyond an arcuate amount equal to the arcuate spacing between engaged and disengaged positions of the clutches, the control collar including means to yieldably hold the clutches against relative rotation and means resiliently urging the cages apart to hold the clutching rollers in constant engagement with the conical surfaces of the axles.

2. A differential drive mechanism as claimed in claim 1, wherein the interconnection between the control collar and the cages includes at least one notch on each side of the collar and a tooth extending from each clutch cage into the notch in the collar on the side adjacent thereto for limited circumferential movement relative to the notch, and the means to yieldingly hold the clutches against relative rotation comprises spring fingers at each side of each notch in the collar to bear against the cage tooth to resiliently bias the tooth against movement in the notch.

3. A differential drive mechanism as claimed in claim 2, wherein means resiliently urging the cages apart comprises resilient side walls on the collar.

References Cited in the file of this patent

UNITED STATES PATENTS

| | | |
|---|---|---|
| 1,175,300 | Ross | Mar. 14, 1916 |
| 1,425,970 | Johnson | Aug. 15, 1922 |
| 1,823,389 | De Lavaud | Sept. 15, 1931 |

FOREIGN PATENTS

| | | |
|---|---|---|
| 125,098 | Russia | Apr. 14, 1959 |